United States Patent

[11] 3,619,015

| [72] | Inventor | Andre Frans Goossens<br>Waasmunster-Sombeke, Belgium |
|---|---|---|
| [21] | Appl. No. | 990 |
| [22] | Filed | Jan. 6, 1970 |
| [45] | Patented | Nov. 9, 1971 |
| [73] | Assignee | The Singer Company<br>Rochester, N.Y. |

[54] BEARING DEVICE HAVING END PLAY ELIMINATION MEANS
3 Claims, 5 Drawing Figs.

[52] U.S. Cl. ............................................. 308/135
[51] Int. Cl. ............................................. F16c 17/04
[50] Field of Search ..................................... 308/135,
165, 166, 166 R, 166 RB

[56] References Cited
FOREIGN PATENTS
371,473  4/1932  Great Britain ................ 308/165

*Primary Examiner*—Martin P. Schwadron
*Assistant Examiner*—Frank Susko
*Attorneys*—George W. Kollian, Patrick J. Schlesinger, Charles R. Lepchinsky and Jay M. Cantor

ABSTRACT: Bearing device having end play elimination means is disclosed wherein axial dimensional tolerance buildup along one axis is substantially eliminated by a conical spacer coaxially disposed along said one axis and a resilient spring member having detenting portions which coact in a wedgelike manner with the conical spacer in a plane normal to the plane of said one axis to eliminate end play along the said one axis.

PATENTED NOV 9 1971 3,619,015

INVENTOR
ANDRE GOOSSENS
BY
George W. Killian
AGENT

3,619,015

BEARING DEVICE HAVING END PLAY ELIMINATION MEANS

BACKGROUND OF INVENTION

1. Field of Invention

The present invention relates generally to a bearing device and more particularly to bearing means for eliminating end play or dimensional tolerance buildup along a given shaft or a longitudinal support member which supports cams, gears, pulleys, and the like, axially.

2. Prior Art

Prior art devices for eliminating end play or compensating for manufacturing dimensional tolerance buildup along the axis of a shaft in a motor or business machine, such as, a typewriter, computer, or calculator, have included the addition of a spacer-type washer, a collet, or a threaded nut coacting with a threaded coaxial bolt to remove shaft end play. End play of a rotating shaft may be very detrimental in a high-speed motor since such end play produces unwanted vibrations and excessive wear. The elimination of end play is submitted to be a problem of long standing in the art.

SUMMARY OF THE INVENTION

Briefly described, the present invention in a preferred embodiment thereof, incorporated in a bearing device for a shaft, includes a conical bearing member having at least one convex conical face coaxially mounted on the shaft and proximal to a shaft-bearing wall. The convex conical face of the bearing member is opposite the shaft-bearing wall and the bearing member is slideable on the shaft and does not normally rotate with the shaft. In accordance with the invention, a bifurcated spring detent means is mounted in a plane normal to the plane of the shaft axis and biases the bearing member coaxially along the shaft and away from the shaft-bearing wall to eliminate end play on the shaft.

DESCRIPTION OF THE DRAWING

The invention both as to its organization and method of operation will be best understood by reference to the following detailed description considered together with the accompanying drawing in which.

DETAILED DESCRIPTION

Figure 1:
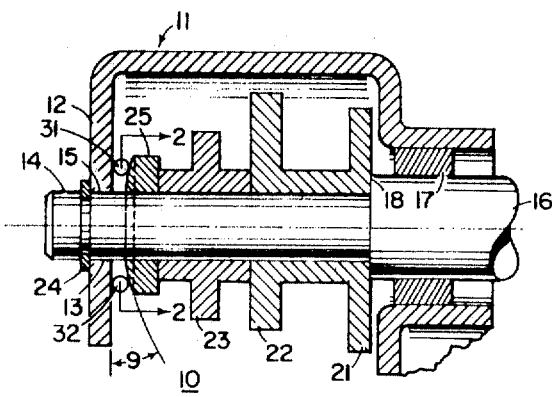
FIG. 1 is a side view of a preferred embodiment of the invention and showing in cross section a bearing device having end play elimination means.
Figure 2:
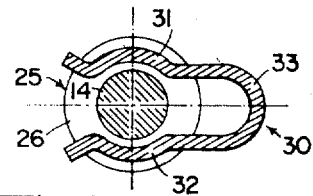
FIG. 2 is a sectional end view of the end play elimination means of the bearing device of FIG. 1 taken along line 2—2.
Figure 3:
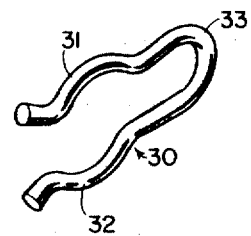
FIG. 3 is a perspective view of a spring retaining means utilized in the invention shown in FIGS. 1, 2, 4 and 5.

Referring now more particularly to FIGS. 1-4, a preferred embodiment of the invention is shown in a bearing device 10. Like reference numerals are used throughout the specification to designate like structural elements. The bearing device 10 is particularly suited for use with a chassis or frame 11 having at least one shaft-bearing wall member 12. The bearing wall member 12 includes a bore 13 for supporting a shaft 14 at one end 15. The shaft 14 may, of course, be supported at another point 16 along the longitudinal axis of the shaft 14 as by a bearing 17. For purposes of describing the present invention, the shaft 14 may be considered to extend beyond the bearing 17 to support other components thereon. The shaft 14 includes a stop or shoulder 18 at which energy translating components such as, for example, a gear 21, and cams 22 and 23 bear. It should be understood that these energy transfer components are merely shown by way of example as components that may be mounted on the shaft 14. End play may be defined as that longitudinal movement of the shaft 14 that remains between the shaft and the chassis or frame 11 after assembly has been completed. In the present application, by way of example, the wall member 12 and a coacting "C" type retainer 24 coact to establish the available space along the longitudinal axis on the shaft 14 for the mounting of the components on the shaft 14. However, it is well known in the art that during manufacturing, such components cannot be held to such a precise tolerance that any axial end play on the shaft 14 would be entirely eliminated.

In accordance with the invention, the bearing device 10 includes a retaining spring means 30 and a conical thrust bearing 25 having a wedgelike or conical face 26 coaxially disposed on the shaft 14 between the wall member 12 and the nearest component on the shaft 14, namely cam 23. It should be understood that the components named hereinabove do not form any part of this invention and are illustrative only. The conical face 26 is diametrically opposed to the wall 12 and defines an angle of repose 9 with the wall member 12. The angle of repose is the maximum angle formed with the conical face 26 at which the retaining spring means 30 will retain its position without further sliding. The angle of repose equals twice the angle whose tangent is the coefficient of static friction for the retaining spring means 30 and the face 26. Thus, the spring means 30 and the face 26 of the conical bearing 25 coact initially to eliminate any end play of the components on the shaft 14 and once the end play is eliminated, the spring retaining means 30 remains at a repose position between the wall member 12 and the conical bearing 25. The bearing 25 may be, for example, a suitable plastic while the spring means 30 may be made of phosphor bronze, or spring steel.

The spring retaining means 30 (FIG. 3) is bifurcated having detent portions 31 and 32 connected by a bridging portion 33. The bridging portion 33 is a spring member which urges detent portions 31 and 32 towards each other. The detent portions 31 and 32 of the spring retaining member 30 coact with the face 26 of the bearing 25 not only to urge the bearing 25 in the direction to eliminate end play on the shaft 14 but also in a direction to retain the spring retaining member 30 coaxially on the conical face 26 of the bearing 25.

Figure 4:
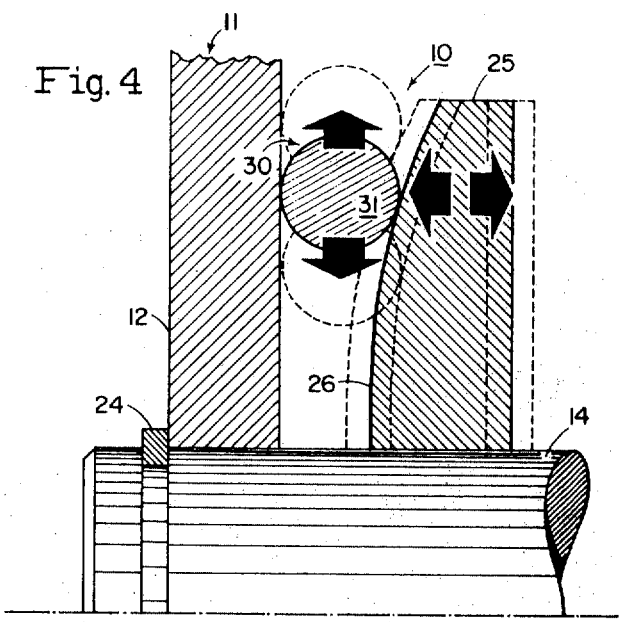
FIG. 4 is an enlarged view of a portion of FIG. 1 to show the coactions of the structural elements of the bearing device and end play elimination means of FIG. 1.

Referring to FIG. 4, an enlarged sectional view of a portion of the bearing device 10 is shown above the longitudinal axis of the shaft 14. The relative movements of the spring retaining means 30 and the bearing 25 is clearly shown by dotted lines to illustrate the degree of movement that each of the elements, namely, detent portion member 31 of the spring means 30 and the bearing 25 may take to eliminate end play on the shaft 14. More specifically, the detent portion 31 will seek a position as close to the axis of shaft 14 as is possible and by such movement will eliminate all possible end play.

In the operation of the bearing device 10, the conical bearing 25 is disposed coaxially on the shaft 14 and does not normally rotate with the shaft. The conical face 26 of the bearing 25 faces the wall member 12. The retaining spring means 30 is inserted between the face 26 of the bearing 25 and the wall member 12 transversely to the shaft 14. The detent portions 31 and 32 move along the face 26 of the bearing 25 in response to the urging of the spring or bridging portion 33 and thus by a wedgelike action move the bearing 25 away from the wall member 12 until end play of the shaft 14 is eliminated. The heavy vertical arrows in FIG. 4 show the relative movement of the detent portion 31 while the heavy horizontal arrows show the relative movement of the bearing 25. An advantage of the invention is that the retaining spring means 30 and bearing 25 may be selected for varied design parameters to eliminate end play.

Figure 5:
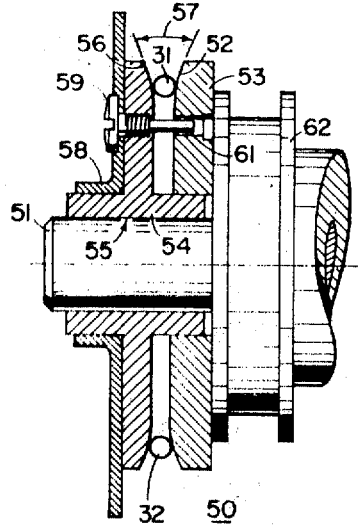
FIG. 5 is a sectional view of another bearing device having end play elimination means in accordance with another embodiment of the invention.

Referring now to FIG. 5, another embodiment of the invention is shown in a bearing device 50. The bearing device 50 of FIG. 5 is similar to the bearing device 10 of FIG. 1 except that a double convex conical face is used to achieve in another way the elimination of end play on a shaft 51. The bearing device 50 includes the same spring retaining means 30 coacting with a conical face 52 of a bearing 53. A bearing 53 is substantially similar to the bearing 25 of the bearing device 10 except that while it is coaxially disposed on shaft 51, it is positioned in cooperative relationship with a hub 54 of a shaft bearing 55. The shaft bearing 55 also includes a conical face 56 diametrically opposed to the conical face 52 such that the angle between the conical face 52 and 56 define an angle of repose 57. The hub 54 of the shaft bearing 55 is press fit into a frame 58 in a manner well known to those skilled in the art to retain the shaft bearing 55 in the frame 58. Where turning forces are present and are so great that the bearings 55 and 53 may turn, a setscrew 59 may coupled the bearings 55 and 53 to the frame 58. The setscrew 59 may be threaded into the shaft bearing 55 and extend to the conical bearing 53 through a hole 61 therein. By way of example, a pulley 62 is shown mounted on the shaft 51. The hub 54 is shown spaced from the pulley 22 while the conical bearing 53 is contiguous to the pulley 62. The movement of conical bearing 53 to the right in response to the urging of spring 30 eliminates end play of shaft 51.

In the operation of the bearing device 50, the retaining spring means 30 is not inserted between the two opposed faces 52 and 56 as in the drawing (FIG. 5) until all of the components are coaxially disposed on the shaft 51 which components were mentioned hereinbefore. Such components, of course, being, for example, a pulley 62 disposed proximal to the bearing 53. The setscrew 59 couples the two conical faces 52 and 56. However, it should be understood that the setscrew 59 may not be required if the forces which act tangentially to the bearing 55 are not sufficient to create a turning of bearings 53 and 55. Once the bearing 53 is interposed between the pulley 62 and the shaft bearing 55, the spring retaining means 30 is inserted transversely to the shaft 56 and is disposed between the conical faces 56 and 52. Since the spring retaining member 30 includes the detent portions 31 and 32, the conical faces 52 and 56 coact with the spring retaining member 30 to retain the spring retaining member 30 thereon while at the same time, urging the bearing 53 in the direction to eliminate end play on the shaft 51.

While there has been shown and described what is considered at present to be the preferred embodiment of the invention, modifications thereto will readily occur to those skilled in the related arts. For example, in another structure, it might be desired to have the elements corresponding to bearings 53 and 55 turn with the shaft 51. It is believed that no further analysis or description is required and that the foregoing so fully reveals the gist of the present invention that those skilled in the applicable arts can adapt it to meet the exigencies of their specific requirements.

What is claimed is:
1. In a bearing device:
   a. a shaft subjected to end play between a bearing wall member, providing at least partial support for said shaft, and a component supported by said shaft;
   b. a bearing having at least one convex face coaxially disposed on said shaft
      i. said convex face of said bearing being disposed opposite said bearing wall member; and
   c. bifurcated spring means having opposed preformed detent portions interposed between the said bearing wall member and said convex face of said bearing and said detent portions of said spring means biasing said convex face of said bearing away from said bearing wall member along the longitudinal axis of said shaft for minimizing said end play of said shaft.
2. The invention defined in claim 1 wherein said convex face of said bearing and said bearing wall member define an angle of repose for said bifurcated spring means.
3. The invention defined in claim 1 wherein said bearing is a thrust bearing.

* * * * *